United States Patent [19]

Elms et al.

[11] 4,157,924

[45] Jun. 12, 1979

[54] PROCESS OF APPLYING WELDABLE COATING COMPOSITIONS TO A METALLIC SUBSTRATE

[75] Inventors: William J. Elms, Lake Jackson; Steven A. Weitzel, Richwood, both of Tex.

[73] Assignee: The Dow Chemical Company, Midland, Mich.

[21] Appl. No.: 937,011

[22] Filed: Aug. 25, 1978

[51] Int. Cl.$^2$ .................... C23F 7/26

[52] U.S. Cl. .................... 148/6.2; 427/386; 427/388 A; 148/31.5

[58] Field of Search .................... 148/6.2; 427/386, 388 A

[56] References Cited

U.S. PATENT DOCUMENTS

| | | | |
|---|---|---|---|
| 3,110,691 | 11/1963 | Fisher | 260/22 |
| 3,671,331 | 6/1972 | Malkin et al. | 148/6.2 |
| 3,687,894 | 9/1972 | Collings | 260/47 EP |
| 3,738,862 | 6/1973 | Klarquist et al. | 427/386 |
| 3,819,425 | 6/1974 | De Ridder et al. | 148/6.16 |
| 3,849,141 | 11/1974 | Palm et al. | 148/6.2 |
| 3,907,608 | 9/1975 | Barrett | 148/6.2 |
| 3,931,109 | 1/1976 | Martin | 260/47 EP |
| 3,970,482 | 7/1976 | Gunn | 148/6.2 |
| 3,990,920 | 11/1976 | De Ridder | 148/6.2 |
| 4,020,220 | 4/1977 | Germano | 427/380 |

OTHER PUBLICATIONS

Kennedy, Zincrometal: Coil Coating's Answer to Corrosion, Modern Paint and Coatings Sep. 1976 pp. 21-26.

*Primary Examiner*—Ralph S. Kendall
*Attorney, Agent, or Firm*—J. G. Carter

[57] ABSTRACT

An improvement in a process for applying a weldable coating to a metallic substrate which process comprises applying to said substrate having a clean surface (I) a first coating containing a hexavalent chromium component and/or a phosphate component and an electroconductive pigment and thereafter curing said coating and (II) applying over said cured first coating a second coating which is a weldable coating containing a high molecular weight epoxy or phenoxy resin, a diluent and an electroconductive pigment and subsequently curing same;

the improvement residing in replacing at least 70 weight percent of said high molecular weight epoxy or phenoxy resin in said second coating with a coating composition comprising (A) a low molecular weight epoxy resin or mixtures thereof having an average of more than one vicinal epoxy group per molecule, (B) a hydroxyl-containing or thiol-containing material or mixture of such materials which is (1) a polyhydric phenolic or thiophenolic compound or (2) the product of reacting (a) a low molecular weight epoxy resin or mixtures thereof having an average of more than one vicinal epoxy groups per molecule with (b) a polyhydric phenolic or thiophenolic compound, a hydrogenated polyhydric phenolic compound or mixture of such compounds wherein the hydroxyl or thiol:epoxy equivalent ratio is from about 2:1 to about 12:1; and (C) a catalytic quantity of a catalyst for effecting the reaction between (A) and (B) and wherein (A) and (B) are present in quantities such that the phenolic hydroxyl or thiol to epoxy equivalent ratio is from about 0.5:1 to about 1.1:1.

11 Claims, No Drawings

PROCESS OF APPLYING WELDABLE COATING COMPOSITIONS TO A METALLIC SUBSTRATE

BACKGROUND OF THE INVENTION

Industry is employing coated metals which are resistant to corrosion and are "weldable" i.e. electrically conductive to fabricate various articles. Such coatings are usually applied in two separate applications, the first being a coating containing a phosphate and/or a hexavalent chromium compound and an electroconductive pigment sometimes referred to as an undercoating followed by a second (top) coating as fully described in U.S. Pat. Nos. 3,067,045; 3,382,081; 3,395,027; 3,671,331; 3,687,739; 3,462,319; 3,819,425. Particularly for automobile applications, the second (top) coating provides a weldable system that must be capable of withstanding a slip or shear adhesive condition while still providing an adquate corrosion resistant, base for subsequent coating operations. As the metal is pressed, such as into a metal stamping die, it flows, while sometimes sliding and stretching, thereby subjecting the coating to shear. Coatings are tested as to their ability to withstand these operations by a test known as the "draw test".

SUMMARY OF THE INVENTION

It has now been discovered that an improved weldable coating composition can be employed over a previous undercoating with a composition containing an electroconductive pigment. The improvement residing is improved "draw test" results and also provide adequate metal corrosion protection.

The present invention concerns the following described improved coating process.

In a process for applying a weldable coating to a metallic substrate which comprises applying to said substrate having a clean surface (I) a first coating containing a hexavalent chromium component and/or a phosphate component and a pulverulent metal and thereafter curing said coating and (II) applying over said cured first coating a second coating which is a weldable coating containing a high molecular weight epoxy or phenoxy resin, an inert diluent and an electroconductive pigment and subsequently curing same;

the improvement wherein at least 70 preferably at least 75 weight percent of said high molecular weight epoxy or phenoxy resin in said second coating has been replaced with a coating composition comprising (A) a low molecular weight epoxy resin or mixtures thereof having an average of more than one vicinal epoxy group per molecule, (B) a hydroxyl-containing material or mixture of such materials which is (1) is polyhydric phenolic compound or (2) the product of reacting (a) a low molecular weight epoxy resin or mixtures thereof having an average or more than one vicinal epoxy groups per molecule with (b) a polyhydric phenolic compound or mixture of such compounds wherein the phenolic hydroxyl or thiol:epoxy equivalent ratio is from about 2:1 to about 12:1, preferably from about 3:1 to about 8:1 most preferably from about 5.5:1 to about 6.5:1; and (C) a catalytic quantity of a catalyst for effecting the reaction between (A) and (B), and wherein (A) and (B) are present in quantities so as to provide a phenolic hydroxyl or thiol to epoxy equivalent ratio of from about 0.5:1 to about 1.1:1, preferably from about 0.75:1 to about 1:1.

DESCRIPTION OF THE PREFERRED EMBODIMENTS

The high molecular weight epoxy or phenoxy resins which are employed in weldable coatings are well known in the art as described in U.S. Pat. Nos. 2,506,486; 3,306,872; 3,379,684; 3,547,881; 3,637,590 and British Pat. No. 980,509 and allowed application Ser. No. 819,321 filed on July 27, 1977 by James A. Clarke entitled "Process for Preparing High Molecular Weight Polyether Resins From Bisphenols and Epoxy Resins".

Particularly suitable high molecular weight epoxy or phenoxy resins include those having repeating units represented by the formula

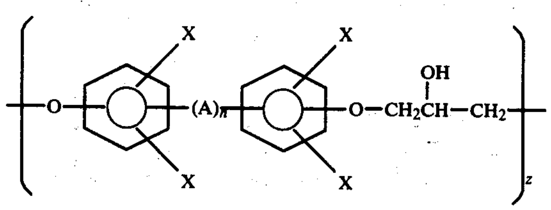

wherein within each repeating unit each X may be the same or different as well as being the same or different with regard to other units within the molecule and is selected from hydrogen, chlorine and bromine, A is a divalent hydrocarbon group having from about 1 to about 12 carbon atoms,

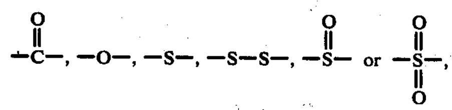

n has a value of zero or one, and z is a number such that the weight average molecular weight is at least about 15,000, preferably about 30,000, and most preferably at least about 40,000.

Such high molecular weight epoxy or phenoxy resins are commercially available from The Dow Chemical Company as D.E.R. 684 EK40. Such resins are also commercially available from Shell Chemical Company as EPONOL 52 B-40, EPONOL 53 B-40, EPONOL 55 L-32, and also from Union Carbide Corporation as Bakelite Phenoxy Resins PKHA, PKHH and PKHC.

Suitable low molecular weight epoxy resins which can be employed herein include, for example, the diglycidyl ethers of dihydric phenols or hydrogenated dihydric phenols. Such epoxy resins can be represented by the formulas

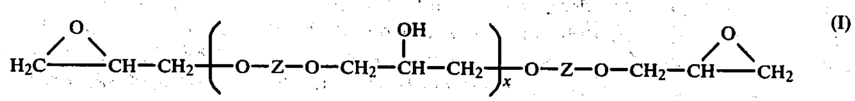

-continued (II)

(III)

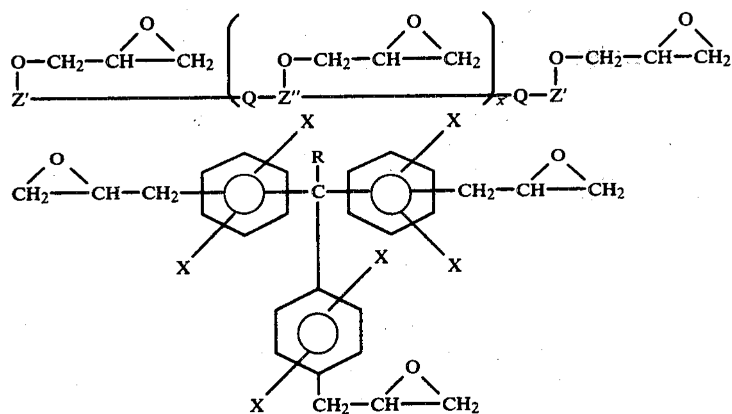

and wherein each Z is independently

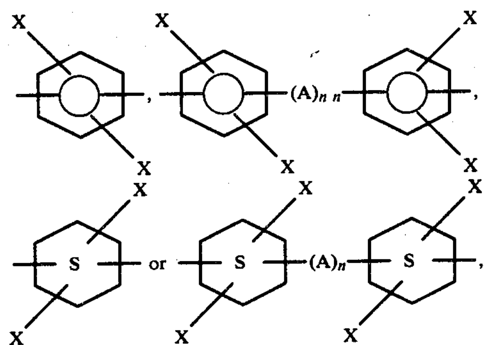

each Z' is independently

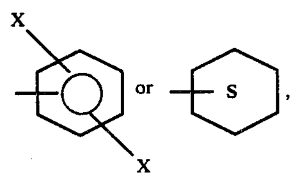

each Z'' is independently

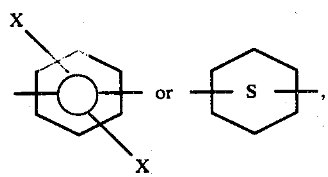

each Q is independently a divalent hydrocarbon radical having from 1 to about 6 carbon atoms, A is a divalent cyclic or acyclic hydrocarbon group having from about 1 to about 12 carbon atoms,

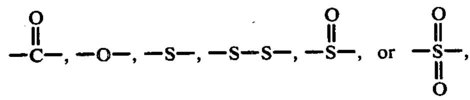

each X is independently hydrogen, chlorine or bromine; R is a hydrocarbon group having 1 to about 6 carbon atoms; n has a value of zero or one; x has an average value of from about 0 to about 4, preferably from about 0.02 to about 0.75, and x' has an average value of from about 0.1 to about 3, preferably from about 0.2 to about 1.8.

Also suitable for use in the present invention are the oxazolidinone modified aromatic or aliphatic based epoxy resins which contain both oxazolidinone groups and epoxy groups provided such modified epoxy resins contain more than one 1,2-epoxy groups. Suitable such oxazolidinone modified epoxy resins are disclosed in U.S. Pat. No. 3,687,897.

Suitable polyhydric phenolic or thiophenolic materials which can be employed in the present invention include, for example, those represented by the formulas (IV)

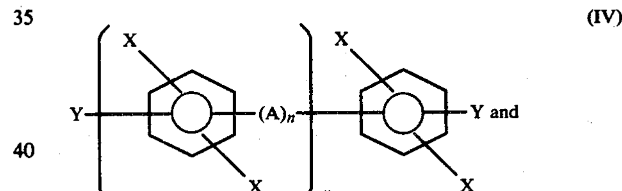

(V)

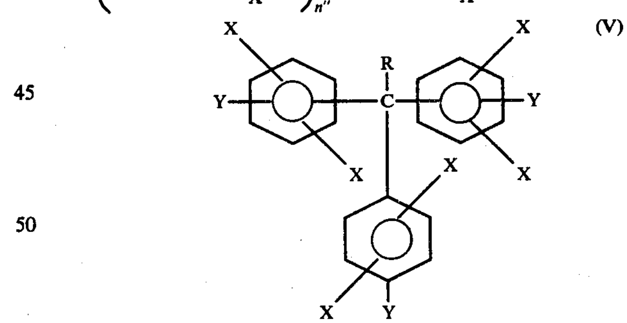

wherein A, X, R and n are as defined above, n'' has a value of zero or 1 and Y is —OH or

—SH.

Particularly suitable hydroxyl-containing materials are the dihydric phenolic materials which include, for example, resorcinol, catechol, hydroquinone, 2,2-bis(4-hydroxyphenyl) propane commonly referred to as bisphenol A, 2,2-bis(4-hydroxyphenyl) methane, 2,2-bis(4-hydroxyphenyl) ethane, the halogen, particularly bromine, substituted derivatives thereof and the like. Also suitable are the corresponding thiophenolic compounds of the above, i.e. those wherein the —OH group has been replaced by an —SH group.

Also suitable are the polyhydric phenolic materials represented by the formulas

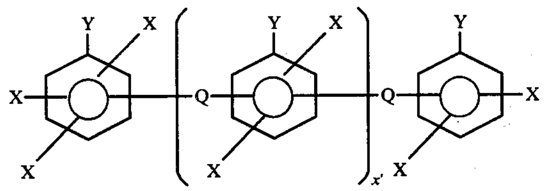

wherein Q, Y and x' are as defined above.

Suitable catalysts for effecting the reaction between the epoxy resin and the phenolic hydroxyl-containing material include, for example, organic phosphonium compounds, ammonium compounds, imidazoles and the like.

The inorganic and organic phosphonium compounds which are employed in the present invention, as catalysts, include phosphonium salts of an acid, acid ester or ester of an element selected from the group consisting of carbon, nitrogen, phosphorus, sulfur, silicon, chlorine, bromine, iodine and boron which are represented by the general formula:

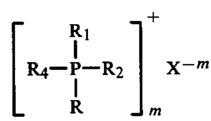

wherein $R_1$, $R_2$, $R_3$ and $R_4$ are independently selected from the group consisting of hydrogen, aliphatic hydrocarbon radicals containing from about 1 to 20 carbon atoms, aromatic hydrocarbon radicals, alkyl substituted aromatic hydrocarbon radicals and radicals represented by the formula $—R_3—Y$ wherein $R_3$ is an aliphatic hydrocarbon radical having from about 1 to about 20 carbon atoms and Y is a member selected from the group consisting of Cl, Br, I, $NO_2$, H and OH and where X is the anion portion of an acid, ester or acid ester of an element selected from carbon, nitrogen, phosphorus, sulfur, silicon, chlorine, bromine, and iodine and wherein m is the valence of the anion X.

Particularly suitable catalysts include ethyltriphenyl phosphonium iodide, ethyltriphenyl phosphonium chloride, ethyltriphenyl phosphonium thiocyanate, ethyltriphenyl phosphonium acetate·acetic acid complex, tetrabutyl phosphonium iodide, tetrabutyl phosphonium bromide, and tetrabutyl phosphonium acetate·acetic acid complex. These and other phosphonium catalysts are more fully described in U.S. Pat. Nos. 3,477,990, 3,341,580 and 3,948,855 which are incorporated herein by reference.

Suitable ammonium compounds include, for example, benzyltrimethyl ammonium chloride and tetramethyl ammonium hydroxide.

Suitable imidazoles which may be employed as catalysts in the present invention include, for example, 2-styrylimidazole, 1-benzyl-2-methylimidazole, 2-methylimidazole, 2-butylimidazole, mixtures thereof and the like. These and other suitable catalysts are disclosed in U.S. Pat. No. 3,634,323 and so much of that patent as it pertains to epoxy resins and advancement catalysts therefor is incorporated herein by reference.

Other suitable catalysts include metal alkoxides such as, for example, aluminum diisopropoxide acetoacetic ester chelate, aluminum tri(sec-butoxide) and aluminum di(sec butoxide) acetoacetic ester chelate which are commercially available from Chattem Chemicals as AIE-M, ASB and ASB and ASE-M respectively.

Suitable pulverulent metals which are employed in the present invention include the electrically conductive pigments such as for example, aluminum, copper, cadmium, steel, carbon, zinc, magnesium, magnetite, i.e., the magnetic oxide of iron, mixtures thereof and the like such as, for example a mixture of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thickness for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these coatings generally are applied preparatory to subsequent welding of the substrate, they must contain a substantial amount of the electroconductive pigment, e.g., at least about 30 volume percent pigment and often more than about 65 percent by volume of particulate pigment, but on a weight basis, because of the density of the pigment, these coatings can contain up to about 90 weight percent of such pigment.

Suitable diluents or solvents include, for example, the oxygenated solvents such as acetone, methylethyl ketone, cyclohexanone, diacetone alcohol, mixtures thereof and the like, and the glycol ethers such as ethylene glycol, ethyl ether acetate; ethylene glycol, methyl ether; ethylene glycol, n-butyl ether; diethylene glycol, ethyl ether; diethylene glycol, n-butyl ether; propylene glycol, methyl ether; dipropylene glycol, methyl ether; mixtures thereof and the like and in some instances in admixture with aromatic solvents such as, for example, xylene, toluene, ethylbenzene and the like. Other suitable solvents include the halogenated solvents such as trichloroethylene, methylene chloride and the like.

Suitable such metallic substrates which can be employed herein include, for example, zinc, aluminum, and particularly the ferrous metals such as, for example, iron, tin-free steel, stainless steel, pickled steel, cold rolled steel and the like.

The method of the present invention is particularly suitable for the continuous coating of ferrous metals, particularly cold rolled steel, subsequently formed or stamped into automobile parts such as fenders, doors, sidepanels and the like and applicance housings such as washers, driers and the like.

The curing of the coatings employed herein will vary, depending upon the composition but will generally vary between from about 120° C. to about 300° C. preferably from about 175° C. to about 275° C. for a time sufficient to cure the coating, usually from about 30 sec. to about 30 min. preferably from about 90 sec. to about 180 sec. The actual temperature of the metal (peak metal temperature) most preferably should reach about 175° C. to about 250° C.

Before applying the coating compositions, the metallic substrates should be rendered free of foreign matter such as grease, oil, dirt and the like by treating or washing with suitable cleaning agents such as ketones, chlorinated solvents, alkaline cleaning compositions and the like. Such cleaning compositions include, for example, sodium metasilicate, sodium hydroxide, carbon tetrachloride, trichloroethylene, acetone, methyl ethyl ketone, aqueous trisodium phosphate-sodium hydroxide solution. Such substrates can also, if desired, be subjected to etching with a strong inorganic acid etching agent, such as, for example, hydrofluoric acid.

If desired, the substrates employed in the present invention may be precoated, after cleaning, with a pulverulent metal free composition containing chromate and/or phosphate ions such as those disclosed in U.S. Pat. Nos. 3,067,045; 3,382,081; 3,462,319; 3,395,027 and 3,687,739.

In some instances, it may be desirable to employ additives to the compositions of the present invention such as, for example, wetting agents, flow control agents, thixotropic agents, moisture absorbents or scavengers and the like.

The following examples are illustrative of the present invention and are not to be construed as to limiting the scope thereof in any manner.

EXAMPLE 1

PREPARATION OF ADDUCT

Into a 1 liter glass reaction vessel equipped with means for stirring, temperature control and nitrogen purging were added:

100 pbw (0.56 equiv.) of a low molecular weight epoxy resin which is the diglycidyl ether of bisphenol A having an average epoxide equivalent weight (EEW) of 180 and an average repeating unit value of 0.07, 400 pbw (3.51 equiv.) of bisphenol A, 0.2 pbw of a 70% solution of ethyltriphenyl phosphonium acetate·acetic acid complex in methanol.

The reactants were allowed to exotherm to a temperature of 160° to 170° C. after which the temperature was maintained at 150° C. for 2.5 hours.

The resultant adduct had a phenolic hydroxyl equivalent weight of 170. The adduct was then blended with 214.3 pbw of the methyl ether of propylene glycol (1-methoxy-2-propanol) hereinafter MEPG and 8.05 pbw of 2-methyl imidazole. In this adduct, the phenolic hydroxyl to epoxide equivalent ratio was 6.27:1.

References hereinafter to adduct refers to the reaction product of the epoxy resin and bisphenol A whereas references to adduct solution refers to the mixture of adduct with MEPG and 2-methyl imidazole.

Coating compositions were prepared by high shear mixing the following compositions.

Coating A. (Comparative)

25 pbw of a high molecular weight phenoxy resin having a weight average molecular weight of 40,000 said resin being commercially available form Union Carbide Corporation as PKHH.

45.37 pbw of EEA (2-ethoxyethyl acetate)

35 pbw EEEG (2-ethoxyethanol)

0.41 pbw calcium oxide (as a water scavenger)

167 pbw of zinc dust having an average particle size of 2 to 4 microns.

Coating B. (An example of the present invention)

14.28 pbw (0.079 equiv.) of a low molecular weight epoxy resin which is a diglycidyl ether of bisphenol A having an average EEW of 180 and an average repeating unit value of 0.07.

15.28 pbw of adduct solution which corresponds to
- 10.58 pbw (0.062 equiv.) adduct
- 4.53 pbw of MEPG (1-methoxy-2-propanol)
- 0.17 pbw of 2-methylimidazole 11.16 pbw EEEG 0.41 pbw calcium oxide (as a water scavenger)

167 pbw zinc dust having an average particle size of 2 to 4 microns.

The phenolic hydroxyl to epoxy equivalent ratio was 0.78:1.

Each of the coatings A and B were applied to 0.037"×4"×12" (0.094 cm×10.16 cm×30.48 cm) cold rolled steel panels precoated with a hexavalent chromium composition containing zinc commercially available from Diamond Shamrock Corp. as DACROMET 200.

Each of the above coated panels were baked at 275° C. for 90 seconds. The panels were then subjected to the draw test employing a die pressure of 2000 psi (140.6 kg/cm$^2$) and a speed of 2 in./min. (5.08 cm/min.).

The results of the "draw test" after the second draw are as follows:

| | Dacromet Precoated |
|---|---|
| Panel A (comparative) | 80% coating retained on panel |
| Panel B (present invention) | 90% coating retained on panel |

EXAMPLE 2

Coatings were prepared according to the present invention by high shear mixing the following composition.

12.5 pbw (0.069 equiv.) of a low molecular weight epoxy resin which is a diglycidyl ether of bisphenol A having an average EFW of 180 and an average repeating unit value of 0.07.

13.66 pbw of a bisphenol A solution containing:
- 6.83 pbw (0.06 equiv.) bisphenol A
- 0.11 pbw of 2-methylimidazole
- 6.72 pbw of MEPG.

7.90 pbw EEEG 0.36 pbw calcium oxide (as a water scavenger)

129.36 pbw zinc dust having an average particle size of 2 to 4 microns.

The phenolic hydroxyl to epoxy equivalent ratio was 0.86:1.

The coating was applied to a 0.037"×4"×12" (0.094 cm×10.16 cm×30.48 cm) cold rolled steel panel precoated with a hexavalent chromium composition containing zinc commercially available from Diamond Shamrock Corp. as Dacromet 200.

The above coated panel was baked at 275° C. for 90 seconds. The panel was then subjected to the draw test employing a die pressure of 2000 psi (140.6 kg/cm$^2$) and a speed of 2 in/min. (5.08 cm/min).

The panel after being subjected to the double draw test retained 60% of the coating.

EXAMPLE 3

Coating compositions were prepared and tested for corrosion resistance employing the salt fog test.

Panel A was prepared from the coating compositions of Coating A in example 1 and the procedures of example 1.

Panel B was prepared from the following coating composition according to the procedures of Example 1.

Coating B 12.5 pbw (0.069) of a low molecular weight epoxy resin which is a diglycidyl ether of bisphenol A having an average EEW of 180 and an average repeating unit value of 0.07.

13.4 pbw of adduct solution which corresponds to
- 9.23 pbw (0.054 equiv.) adduct
- 4.02 pbw MEPG
- 0.15 pbw 2-methylimidazole
- 7.9 pbw EEEG 146.42 pbw zinc dust having an average particle size of 2 to 4 microns.

The phenolic hydroxyl to epoxy equivalent ratio was 0.78:1.

Both panels were subjected to the salt fog test as described in ASTM B 117 for 240 hours. The panels were then evaluated for blistering according to ASTM D714-56 and for cross cut adhesion as described by H. A. Gardner and G. G. Sward, *Paint Testing Manual: Physical And Chemical Examination, Paints Varnishes, Laquers, Colors,* 12th ed., 1962, Gardner Laboratory Inc., P.O. Box 5728, Bethesda, Maryland, page 160.

The results were as follows:

| | Blistering | Cross cut (% coating retained) Adhesion |
|---|---|---|
| Panel A | D # 7 | 15–25 |
| Panel B | F # 9 | 99 |

We claim:

1. In a process for applying a weldable coating to a metallic substrate which comprises applying to said substrate having a clean surface (I) a first coating containing a hexavalent chromium component and/or a phosphate component and an electroconductive pigment and thereafter curing said coating and (II) applying over said cured first coating a second coating which is weldable coating containing a high molecular weight epoxy or phenoxy resin, a diluent and an electroconductive pigment and subsequently curing same;

the improvement wherein at least 70 weight percent of said high molecular weight epoxy or phenoxy resin in said second coating has been replaced with a coating composition comprising (A) a low molecular weight epoxy resin or mixtures thereof having an average of more than one vicinal epoxy group per molecule, (B) a hydroxyl-containing or thiol-containing material or mixture of such materials which is (1) a polyhydric phenolic or thiophenolic compound or (2) the product of reacting (a) a low molecular weight epoxy resin or mixtures thereof having an average of more than one vicinal epoxy group per molecular with (b) a polyhydric phenolic or thiophenolic compound, a hydrogenated or partially hydrogenated polyhydric phenolic compound or mixture of such compounds wherein the phenolic hydroxyl or thiol:epoxy equivalent ratio is from about 2:1 to about 12:1, and (C) a catalytic quantity of a catalyst for effecting the reaction between (A) and (B), and wherein (A) and (B) are present in quantities such that the hydroxyl or thiol to expoxy equivalent ratio is from about 0.5:1 to about 1.1:1.

2. The process of claim 1 wherein Components (A) and (B-2a) are glycidyl ethers of a polyhydric aromatic compound and Component (B) is the reaction product of Component (B-2a) with Component (B-2b) and wherein the substrate is a ferrous metal.

3. The process of claim 2 wherein at least about 75 percent by weight of the high molecular weight epoxy or phenoxy resin is replaced and Components (B-1) and (B-2b) are phenolic hydroxyl-containing compounds.

4. The process of claim 3 wherein Components (A) and (B-2a) are represented by the formula

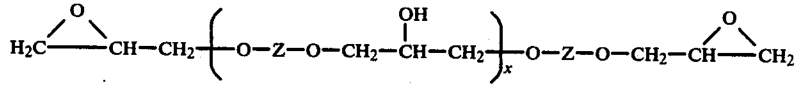

wherein Z is represented by the formula

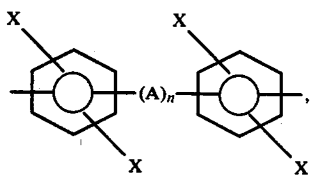

A is a divalent hydrocarbon group having from about 1 to about 12 carbon atoms,

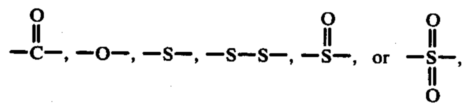

each X is independently hydrogen, chlorine or bromine; n has a value of zero or one; x has an average value of from about 0 to about 4; the phenolci hydroxyl: epoxy equivalent ratio in Component (B) is from about 3:1 to about 8:1 and Components (A) and (B) are present in quantities such that the phenolic hydroxyl to epoxy equivalent ratio is from about 0.75:1 to about 1:1 and the electroconductive pigment is zinc.

5. The process of claim 4 wherein the low molecular weight epoxy resin of Components (A) and (B-2a) are that wherein X is hydrogen, n is 1, x has an average value of from about 0.02 to about 0.75, A is

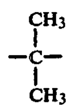

and the phenolic hydroxyl:epoxy equivalent ratio in Component (B) is from about 5.5:1 to about 6.5:1.

6. The process of claim 5 wherein the epoxy resin of Component A and Component (B-2a) are the same; wherein Component (B-2b) is bisphenol A and Component (C) is 2-methylimidazole.

7. The process of claims 1, 2, 3, 4, 5 or 6 wherein the substrate is a ferrous metal.

8. The process of claim 7 wherein the ferrous metal is steel.

9. An article coated by the process of claims 1, 2, 3, 4, 5 or 6.

10. An article coated by the process of claim 7.

11. An article coated by the process of claim 8.

* * * * *